United States Patent [19]
Van Werven et al.

[11] 3,852,487
[45] Dec. 3, 1974

[54] MEAT PASTE PRODUCT AND PROCESS FOR PREPARING SAME

[75] Inventors: Ferdinand Maria Van Werven, Rhoon; Frits Peter Bohlmeyer, Berghem, both of Netherlands

[73] Assignee: Lever Brothers Company, New York, N.Y.

[22] Filed: Oct. 10, 1972

[21] Appl. No.: 296,459

Related U.S. Application Data

[63] Continuation-in-part of Ser. No. 67,573, Aug. 27, 1970, abandoned.

[30] Foreign Application Priority Data

Aug. 28, 1969   Great Britain .................... 42844/69

[52] U.S. Cl. ................. 426/149, 426/371, 426/388
[51] Int. Cl. ...................... A22c 18/00, A22c 25/00
[58] Field of Search ........... 426/212, 149, 272, 274, 426/315, 371, 388

[56]   References Cited
   UNITED STATES PATENTS

| | | | |
|---|---|---|---|
| 3,253,931 | 5/1966 | Coleman et al...................... | 426/211 |
| 3,486,910 | 12/1969 | Saenz................................. | 426/149 |

*Primary Examiner*—Hyman Lord
*Attorney, Agent, or Firm*—Lever Brothers Company

[57]   ABSTRACT

A shaped, consolidated meat paste suitable for canning, freezing or drying can be made by mixing finely divided raw meat and separated muscle fibre bundles and extruding the mixture after deaeration. The separated muscle fibre bundles should be in a cooked state if derived from the meat of mammals or poultry, whereas they may be raw or cooked if derived from fish. The meat paste after extrusion is characterised by a high proportion of aligned fibre bundles which impart to the product the character of lean uncomminuted meat.

10 Claims, No Drawings

MEAT PASTE PRODUCT AND PROCESS FOR PREPARING SAME

This application is a continuation-in-part of our co-pending application Ser. No. 67,573, filed Aug. 27, 1970 now abandoned.

The invention relates to the preparation of reformed meat products and to the meat so obtained.

Many cuts of meat contain connective tissue of such a kind or in such a proportion that the meat is tough to eat unless the connective tissue is wholly or partly removed prior to processing. The term "meat" as used herein means not only the meat of mammals but also the meat of fish, poultry and of shell fish. The present invention can be applied to such meat to convert it to a meat product which, by virtue of its improved tenderness, is more acceptable. The invention can also be employed in the utilisation of meat trimming and by-product meats which by their appearance may not be easily salable although such meats provide the same nutritional value as premium meats.

Tender meat products can be prepared by making a paste of finely divided raw meat and shaping the paste, for example by pressing it into moulds, and thereafter heat setting it to consolidate it so as to obtain a compacted meat product which can subsequently be cooked and served in a form resembling a piece of whole meat. Such a product, which can be called reformed meat will, however, on consumption be found to have a randomised structure quite unlike that attributable to the texture of whole pieces of meat, which texture is constituted by groups of muscle fibre bundles held together by connective tissue and other associated structures well known to the meat histologist. Some degree of control can be applied to the texture of such reformed meat products by adding to the paste which is subsequently moulded and consolidated, a proportion of coarsely chopped cooked meat or a proportion of spun vegetable protein fibres. Reformed meat can thereby be controllably toughened to meet the requirements of the consumer who expects to experience some degree of chewability when the product is eaten. This type of product will however be different in texture and appearance, by virtue of its randomised structure, from whole meat which has not been reformed and will therefore lack the characteristics attributable to good quality whole meat.

We have discovered that it is possible to prepare, by a special combination of process steps involving the treatment of specially prepared ingredients, a reformed meat product having the physical and organoleptic properties of good quality whole meat. We have thus been able to obtain from subdivided meat, a type of reformed meat product which more closely resembles tender whole meat and which, furthermore, possesses economic advantages in its preparation, in that it is possible to obtain a higher cooking yield or, in other words, a lower fluid loss on cooking, than is possible with reformed meat which has not been treated according to the invention.

According to the invention there is provided a shaped, consolidated reformed meat product comprising from about 2.5 percent to about 70 percent by weight of a texturising component and from about 30 percent to about 97.5 percent by weight of a comminuted meat composition. The texturising component consists of separated meat muscle fibre bundles in which the fibre bundles are from 2 to 50 mm in length and from about 0.5 to 2 mm in diameter. The comminuted meat composition contains meat having an average particle size of less than 2 mm. In addition to the meat, the comminuted meat composition will also contain fat, salt and water as well as optional additives such as seasonings, cereals, vegetables, flours, vegetable protein material and other ingredients which are well known to the art.

In the finished reformed meat product, it is important that at least 70 percent of the fibre bundles are substantially in parallel alignment. Also, when the fibre bundles are derived from meat of animals or poultry, it has been found that good results are obtained when the fibre bundles are in a cooked state. In the case of fish or shell fish meat raw fibre bundles can be used with good results.

The reformed meat product will usually have a total moisture content of from about 50 percent to about 80 percent and a total fat content from about 1 percent to about 40 percent.

The meat paste of the invention can be prepared by subdividing raw meat so as to provide a comminuted meat composition consisting of finely divided raw meat in an emulsion of fat and water stabilised at least partly by raw meat protein, the raw meat having an average particle size of less than 2 mm; subdividing cooked meat so as to provide a texturising component consisting of separated muscle fibre bundles, each fibre bundle being from 2 to 50 mm in length and from 0.5 to 2 mm in diameter; blending from 30 to 97.5 parts by weight of the comminuted meat composition and from 2.5 to 70 parts by weight of the texturising component, to provide a meat paste having by weight a total moisture content of from 50–80 percent and a total fat content of from 1–40 percent; extruding the paste to form a shaped extrudate in which the proportion of muscle fibre bundles which are in substantial parallel alignment with each other is from 70–100 percent; and consolidating the extrudate by freezing or by heat setting.

The meat paste of the invention can also be prepared by subdividing raw fish so as to provide a comminuted meat composition consisting of finely divided raw fish in an emulsion of fat and water stabilised at least partly by raw fish protein, the raw fish having an average particle size of less than 2 mm, and a texturising component consisting of separated muscle fibre bundles, each fibre bundle being from 2–50 mm in length and from 0.5–2 mm in diameter; blending the comminuted meat composition and the texturising component with sufficient fat and water as may be necessary to provide a paste having by weight a total moisture content of from 50–80 percent and a total fat content of from 1–40 percent, the paste so obtained comprising from 30–97.5 percent by weight of the comminuted meat composition and from 2.4–70 percent by weight of the texturising component; extruding the paste to form a shaped extrudate in which the proportion of separated muscle fibre bundles which are in substantial parallel alignment to each other is from 70–100 percent; and consolidating the extrudate by freezing or by heat setting.

The separated muscle fibre bundles, which form a part of the paste are derived from whole meat by mechanically separating individual fibre bundles from the groups or sheets of fibre bundles which constitute the major part of the muscular tissue of meat. Further subdivision of this part to individual fibres or fibre fragments is avoided as far as is possible.

It will be appreciated that in raw meat, muscle fibres are long, narrow, multi-nucleated cells which may stretch from one end of the muscle to the other end and which may attain a length of more than 30 cm, although they are generally only 10–100 $\mu$ in diameter. The length and diameter of muscle fibres differ from one muscle to another and between species, breeds and sexes. Muscle fibres in intact muscle or, in other words, in whole meat, are grouped into bundles, each bundle having a sheath of collagenous protein known as connective tissue which consists of randomly orientated collagen fibres. When meat is cooked, a degree of muscle shrinkage generally occurs with resultant shortening of the muscle fibre bundle length. Cooking also results in at least partial conversion of the connective tissue collagen to gelatin, thus giving rise to partial disintegration of the connective tissue sheath and accordingly providing a tenderising effect noticeable when cooked meat is consumed.

The muscle fibre bundles of the invention are accordingly those fibre bundles which have been separated, by breakdown of enclosing connective tissue, from the groups of bundles that occur in meat. The dimensions of the separated muscle fibre bundles will depend partly on the nature and size of the constituent muscle fibres and partly on the degree of subdivision applied to the meat prior to or during their separation from each other. It will be appreciated for example that when mammalian or poultry meat is butchered after slaughter, the muscular tissue of the animal which constitutes meat is, for convenience, cut into pieces thus involving the severance and hence shortening of the muscle and its component parts. However, it is advantageous to select straight-fibred muscle meat when preparing muscle fibre bundles of suitable dimension.

The separated muscle fibre bundles for use in the invention should be at least 2mm in length and will usually be from 2–50mm in length. The preferred length is from 3–25mm. The average diameter of these muscle fibre bundles will usually be from 0.5–2mm.

The quantity of the texturising component used should constitute at least 2.5 percent by weight of the wet paste. Usually, the quantity of the texturising component used will constitute from 2.5–70 percent, preferably from 20–45 percent on the same basis.

When the meat is fish or shell fish, the separated muscle fibre bundles are preferably prepared in the raw state for addition to the paste, since we have shown that the use of cooked fish or shell fish can provide separated muscle fibre bundles which are sometimes excessively tough and hence unsuitable for incorporation into the paste. The reason for this occasional excessive toughness is not fully understood, but it is believed to be associated with the conditions under which the fish may be stored prior to use in preparing the product of the invention.

Apparent toughness can be minimized or avoided by blending together the separated fish muscle fibre bundles derived from different species of fish or by blending together the separated fish muscle fibre bundles with those derived from cooked mammalian or poultry meat.

When the meat is animal or poultry meat, the separated muscle fibre bundles of the texturising component are derived from meat which has already been cooked and, when incorporated into the paste, are accordingly in a cooked state in which their constituent proteins are fully heat denatured. In this form, the separated cooked muscle fibre bundles impart to the final product a desirable textural quality resembling that of tender uncomminuted meat, but it is important to note that the paste into which the separated cooked muscle fibre bundles are incorporated contains also a proportion of a comminuted raw meat composition. This raw meat composition serves to form a matrix in which the cooked separated muscle fibre bundles are held in position in the end product of the invention which is subsequently prepared for consumption.

The method adopted to provide separated muscle fibre bundles from butchered or filleted meat will depend on the nature and condition of the meat itself. It is possible to use commercially available meat comminution equipment provided that care is taken, for example, by adjustment of speed or setting, to ensure that the mode of comminution is not severe enough to subdivide the meat to an extent such that the separated muscle fibre bundles thereby obtained are of smaller dimension or fewer in proportion to that which is considered necessary as defined herein.

As an example, separated muscle fibre bundles may be obtained by carefully pressing the selected meat through the nip of rollers rotating at different speeds which thereby apply a teasing action sufficient to separate the constituent muscle fibre bundles without causing undue severance. Alternatively, the separated muscle fibre bundles may be obtained by carefully controlled use of other means well known in the art, for example by comminution with a silent cutter or a bowl chopper, or by the use of a colloid mill, a hammer mill, or a carborundum disc mill. Such equipment may, if necessary after adjustment or modification, be used to apply a rubbing or teasing action to the meat, whether cooked mammalian or poultry meat or cooked or raw fish, instead of a chopping action sufficient to reduce undesirably the average muscle fibre bundle length.

When, however, the meat is raw fish or shell fish, we have for example found that a convenient way to subdivide the meat to a form in which the texturising component contains the requisite proportion of appropriate sized separated muscle fibre bundles, is to force it if necessary after deboning, through a plate having for example 1.5 mm diameter holes. Other methods of suitably subdividing raw fish or shell fish meat may be employed.

When the meat is animal meat, it should be thoroughly cooked after butchering, for example by boiling in water or by steaming so as to convert them by heat denaturation to a fully shrunken state before being subdivided to its constituent muscle fibre bundles thereby to provide the texturising component.

Preferably the butchered meat is pressure cooked in an atmosphere of steam. As an example, raw meat may be cut into chunks weighing about 1–2 kg and pressure cooked at a temperature of 120°C for 60 minutes. The meat may of course be cooked 'on the bone' or before separation of other inedible material which may be removed subsequently before subdividing the meat to muscle fibre bundles.

After cooling and removal of any inedible material such as bone or gristle that may remain, the meat is subjected to the treatment referred to above to reduce it as far as is possible to separated but substantially intact muscle fibre bundles.

According to the preferred method applicable to mammalian or poultry meat, separation of cooked meat into its constituent muscle fibre bundles may be achieved by subjecting the pieces of cooked meat, preferably after separation of any gross fat deposits, to a rubbing action in a conventional bowl chopper with a blade setting from the wall of the bowl of not less than about 2 mm and preferably about 3–4 mm. Normally, when a bowl chopper is used for chopping raw meat, the rotating blades are set to a finer gap of from 0.5–2 mm clearance from the bowl wall in order to achieve very fine subdivision of the meat, but we have found that the use of such a fine setting when bowl chopping lean cooked mammalian or poultry meat generally results in subdivision to a very fine state where the proportion of muscle fibre bundles greater than 2 mm in length is small. However, by operating a bowl chopper with the wider blade setting, the cooked meat can thereby be rubbed apart rather than chopped, with a result that the individual muscle fibre bundles of the cooked meat can be readily teased apart and separated from each other without undue shortening in length.

The comminuted meat composition which forms part of the paste is intended subsequently on heating to function as a binder between the separated muscle fibre bundles and between other structural or particulate components of the paste that can additionally be present. The finely divided raw meat of the comminuted meat composition should have an average particle size of less than 2 mm.

The nature and size of these additional structural or particulate components will depend on the subsequent treatment to be applied to the paste which can ultimately be converted to an edible end product. For example, when the product is to be dehydrated, it is preferred that the finely divided raw meat of the comminuted meat composition be supplemented with coarsely ground raw meat such as may be obtained by mincing raw meat through a plate having apertures no greater than 15 mm, and preferably from 2–15 mm in diameter. This coarsely ground raw meat thus serves to impart to the paste an "open" structure which is more amenable to dehydration. On the other hand, when the product is intended to be canned or frozen without an intervening dehydration step, it is not necessary to provide the paste with a coarsely ground raw meat component, since a more compact structure is preferred. However, it is not necessary that the original fibre structure of the raw meat from which the finely divided raw meat is prepared is totally destroyed, provided that at least 90 percent by weight of the finely divided raw meat solids have the defined particle size which does not exceed about 2 mm.

The comminuted meat composition should form at least 30 percent, suitably 30–97.5 percent, preferably 50–80 percent by weight of the paste and should in any case contribute at least 1 percent, preferably 5–50 percent by weight of total meat protein to the paste, expressed on a similar basis.

It is of course possible to include as a portion of the comminuted meat component a heat coagulable vegetable protein ingredient such as soya bean protein or peanut protein.

Raw meat may be converted to a very finely divided state, e.g., by comminution in a conventional bowl chopper using a conventional knife array set for example at a gap of about 0.5–1 mm. Other meat comminution machinery such as a colloid mill or a hammer mill may be used when appropriately adjusted for very fine comminution.

It is particularly important that the comminution temperature of the raw meat from which the comminuted meat composition is prepared is not high enough to destroy its property of acting as an emulsifier or as a heat setting binder in any product prepared according to the invention. Raw meat can thus be stored frozen or chilled until required for use and then cut or sliced into chunks or pieces of a size suited to the meat mincing or comminution equipment selected for this operation. Further rise in temperature which can occur during coarse grinding or comminution to a finely divided state, whichever is appropriate, can be checked by using refrigerated equipment or, more simply, by addition of solid carbon dioxide or ice prior to or during the comminution step.

According to a preferred embodiment of the invention, we have found, e.g., when making a meat product from boneless beef, pork or chicken, that the raw meat may be kept under refrigeration at a temperature of about −18°C until required for conversion to the comminuted meat composition without noticeable deterioration in quality. Before processing, the refrigerated meat is tempered at a temperature of from −2° to +1°C for 12 hours. If necessary, large blocks may conveniently be sliced in a semi-frozen state for tempering. Pieces of semi-frozen meat can then be bowl chopped with occasional addition of ice and other ingredients such as flavouring materials and salt. For best results, we have found that the temperature of the raw meat during bowl chopping should not normally rise above about 15°C, otherwise the properties and characteristics of the products subsequently to be obtained may be adversely affected. However, higher temperatures may be permitted provided the aforementioned emulsifying and binding characteristics are maintained.

According to a preferred embodiment of the invention, we have found that preparation of the comminuted meat composition from raw meat is facilitated by use in the chosen comminution equipment of at least a portion of the water to be eventually incorporated in the paste. This added water may of course take the form of ice or broth or other liquors, for example, the liquor remaining after meat has been cooked. It is also convenient to incorporate at this stage additional fat or oil as is considered desirable, particularly where the raw meat employed is lean meat.

The resulting emulsion of water and fat containing comminuted finely divided raw meat has a fine texture which on microscopic examination indicates a gel structure with only a few discernable fibres. It is believed that the protein of the finely divided raw meat functions as an emulsifier of the fat and water phases, thus providing a stabilised emulsion which subsequently forms the basis of the paste of the invention.

The solids content of the paste should be such that when the paste is extruded, sufficient shear is applied to align the separated muscle fibre bundles to the extent defined herein. For this purpose, the non-aqueous solids of the paste should comprise from about 20 to about 50 percent by weight of the paste, the remainder being water or aqueous phase.

Supplementary water when required for lowering the solids content of the paste to a desired value may of course be incorporated into the paste.

The paste should in any case contain at least 1 percent, suitably from 1–40 percent, preferably from 10–30 percent by weight of fat or oil, some of which may be derived from the meat from which the muscle fibre bundles are separated or from the comminuted meat composition.

As we have already stated, the fat or oil which constitutes part of the paste should be in the form of an emulsion with water stabilised at least partly by raw meat protein. Other food grade emulsifying agents may additionally be used to supplement the emulsifying properties of raw meat protein.

The paste may also comprise other additives which serve as texturizing aids, water binders, gelling agents, flavourings and colouring agents. As an example of other texturising aids, spun vegetable protein fibres may be used, particularly to supplement the function of the separated muscle fibre bundles. Food grade phosphates, particularly polyphosphates, serve as an example of water binding agents which can be incorporated into the paste thereby to reduce fluid loss and product shrinkage that can occur when a meat product is cooked. Gelling agents such as modified starches and celluloses, for example carboxymethyl cellulose may also be incorporated into the paste.

While examining fluid loss on cooking or heating of the subsequently extruded product, we have observed, for example that the water loss may be as much as 40 percent calculated as:

$$\frac{100 \times \text{weight of water loss on cooking}}{\text{weight of paste}}$$

If, however, there are included in the paste ingredients such as the aforementioned phosphates or suitable starchy or cellulosic materials, in amounts which have the effect of depressing the amount of water lost on cooking, the above value of up to 40 percent can fall to 10 percent or less.

The effect of including a given amount of such a water binding or gelling agent in the meaty mixture can be readily investigated by the following simple test:

A known weight (suitably about 40 g) of the paste containing the water binding agent is firmly compacted into the lower half of a cylindrical glass funnel (diameter 9 cm, length 4 cm) to the base of which is sealed a downwardly extending graduated glass tube (diameter 1.3 cm, length 20 cm) closed at its lower end. A perforated plate at the junction prevents the mixture from entering the tube. The funnel is loosely stoppered and the apparatus is put into a batch of water maintained at 85°C, with only the upper half of the cylindrical funnel protruding from the water, and allowed to remain there for 1 hour. The water and fat lost from the mixture during cooking drain into the graduated tube. After 1 hour the apparatus is removed from the bath, gently tapped to facilitate drainage of any further liquid, and put back into the bath for 5 minutes. The volume of water in the graduated tube (which water forms a clearly defined layer below the fat) is then read off.

The paste which is subsequently to be extruded is conveniently prepared by mixing together appropriate ingredients in amounts as herein defined. This mixing process may be illustrated as follows:

According to a preferred embodiment of the invention, when preparing a meat product for subsequent canning from starting materials which include separated cooked muscle fibre bundles as the texturising component and finely comminuted raw meat at the comminuted meat composition, the raw meat is first intimately mixed with the appropriate quantity of fat and water and minor ingredients such as phosphate, colouring matter and flavouring to form an emulsion before conversion to a paste by incorporation of separated cooked muscle fibre bundles. This sequence of mixing events is preferably since it is possible thereby to ensure that the separated cooked muscle fibre bundles are not subjected to excessive working during mixing as can partially destroy their property of imparting to the end product an aligned fibrous structure.

An intimate mixture may be obtained by using any suitable mixing equipment. During the mixing it has been found that gases, such as air, may be entrapped or incorporated in the paste. If this occurs, we have found that to ensure optimum fibre bundle alignment during subsequent extrusion of the mixture and in order to obtain on subsequent cooking a product which closely resembles cooked whole meat, it is preferred to degas the paste. The entrapped gas may interfere with the fibre bundle alignment and may on subsequent extrusion or on subsequent heating produce a product, which may visually resemble the whole or uncomminuted meat that it is intended to simulate, but which may be texturally not quite so satisfactory as a degassed product. A salable product can be made when degassing step is omitted. For example it has been found that a degassing step is not required when the product is air-dried.

Degassing of the mixture can suitably be achieved by applying a reduction in pressure thereto, for example by mixing, at least during the final stages, in a vacuum mixer. As an example of how this degassing procedure may be carried out, we have found that a meat paste may be prepared by mixing its ingredients at ambient atmospheric pressure in a Werner and Pfleiderer mixer for 5 minutes, mixing then being continued for a further minute after the mixer has been closed in a gas tight fashion and the mixing chamber evacuated by means of a vacuum pump. In this example, we have found that it is advisable to apply to the paste a reduction in pressure to about 20 cm Hg or lower. It is to be understood that other forms of vacuum mixer such as for example a Hobart vacuum mixer may be employed for the same purpose and that the degree of pressure reduction applied is not critical, provided that entrapped gases which will usually be air, are removed from the paste prior to extrusion. It is also possible to degas the mixture in the equipment which is used for extrusion, for example by using a Carl Schnell continuous vacuum sausage stuffer.

When the paste has thus been prepared, the separated muscle fibre bundles that are present in the paste are oriented to form a product wherein the proportion of muscle fibre bundles which are in substantial parallel alignment with each other is from 70 to 100 percent. It is usual to accomplish the orientation by extruding the paste through a nozzle. It is preferable to extrude the paste to form an extrudate without application of heat during the extrusion step sufficient to induce coagulation of raw meat protein or of other ingredients with similar properties that may be present in the paste.

The provision of shear force during extrusion sufficient to orientate the separated muscle fibre bundles in the manner described will depend on various factors such as the viscosity of the paste, the proportion of separated muscle fibre bundles present in the paste, the force applied in order to extrude the paste and the dimensions and configuration of the extrusion nozzle.

With respect to the criticality of nozzle design suitable for use according to the invention, we have for example found that if the paste is extruded via a cylindrical tube of 2 cm diameter and 5 cm in length, the degree of fibre alignment in the extrudate is very slight and certainly represents alignment of less than 70 percent of the separated muscle fibre bundles present in the state. If, however, a tube of diameter less than 2 cm or of length greater than 5 cm is employed in preparing a comparable extrudate, the proportion of aligned fibre bundles can be greater. As an example, when a paste according to the invention is extruded along a parallel sided tube 25 cm in length and having a rectangular cross-section of 12 cm × 3 cm, then the extrudate shows a fibre bundle aligned surface region of no more than 0.5 cm in depth, the fibre bundle distribution in the interior of the extrudate being apparently random in that little or no alignment is discernable: the proportion of separated muscle fibre bundles which in this example are in substantial parallel alignment with each other is therefore no more than about 40 percent. However, when a 25 cm long parallel sided tube of 12cm × 0.6cm cross-section is used, the extruded product shows a correspondingly higher degree of fibre alignment which is not restricted only to the surface region of the extrudate: here the proportion of separated muscle fibre bundles in substantial parallel alignment with each other exceeds 70 percent.

In order to prepare an extrudate in which the proportion of separated muscle fibre bundles which are in alignment is at least 90 percent, we have found that a cylindrical or parallel sided extrusion nozzle should be at least 12cm in length and preferably 15 to 75cm in length, the diameter or shortest cross-sectional dimension between opposing sides being less than 3cm and preferably less than 1cm.

A particularly convenient nozzle which is suited to impart adequate shear forces to the paste during extrusion and which will obviate the need to provide an inconveniently long passage-way for extrusion is a nozzle having a cross-sectional area which progressively decreases along the passage-way in the direction traversed by the paste. Such a nozzle may for example define a hollow truncate cone or pyramid. The tapering of such a passage-way may terminate at the nozzle exit from which the extruded paste issues, or the passage-way may become linear or divergent before reaching the nozzle exit.

As an example of a tapering passage-way nozzle and according to a preferred embodiment of the invention, we employ a nozzle which is rectangular in cross-section, the effective internal dimensions of the cross-section decreasing uniformly from 12cm × 3cm at the input end to 12cm × 0.6cm at the output end over a total nozzle length of 25cm. By using such a nozzle, we are able to obtain an extrudate in which separated muscle fibre bundle alignment has occurred both in the superficial region and throughout the interior of the extrudate.

When we employ a nozzle having a tapering passage-way in which the diameter or smallest cross-sectional dimension between opposing sides of that passage-way at the output end exceeds 1.5cm, then we find that the fibre bundle alignment is generally restricted to the outer part of the extrudate to a depth of about 0.5cm, leaving a softer core of randomly distributed fibre bundles. Such a product when cooked, while not completely resembling cooked uncut meat, is however a product which possesses novel and commercially useful organoleptic characterisitcs.

When it is desirable to prepare a product having a minimum cross-section dimension between opposed sides or diameter, as appropriate, of greater than 2cm wherein separated muscle fibre bundle alignment is present substantially throughout the product, we have found it convenient to insert or build into the nozzle an axially aligned plate which subdivides the tapering passage-way into two smaller passage-ways, the plate being arranged along or substantially parallel to the axis of extrusion, the two smaller passage-ways thus formed being themselves tapered. By this means, axial alignment of fibre bundles is initiated within the paste being extruded in the region where it is close of each longitudinal surface within the nozzle. As the paste proceeds along the passage-ways, the degree of fibre bundle alignment appears to increase within the paste primarily in the region of each longitudinal passage-way wall, the exiting extrudate possessing bands of fibre alignment, as seen in transverse cross-section, of a depth of about 0.5cm, each band having been defined by a pair of opposed passage-way walls.

It is not fully understood why use of a tapered passage-way increases the degree of fibre bundle alignment in the extrudate but it is believed that the differential flow characteristics of the paste, induced at least partly by a gradually diminishing cross-sectional dimension with a corresponding increase in pressure and stress within the material being extruded as it proceeds along the tapering passage-way, lead to a build up of shear forces proportionally greater than would be manifest in a parallel sided or linear passage-way nozzle, thereby inducing alignment of a great proportion of fibre bundles in the paste than would otherwise be expected.

It is furthermore possible to employ the tapering passage-way nozzle fitted with more than one axial plate or, indeed with a plurality of plates so as to subdivide the original tapered, passage-way into a series of smaller tapered passage-ways.

As already indicated, in order to prepare an extrudate which may later be cooked to a product resembling with respect to texture whole cooked meat, it is desirable that at least 70 percent of the separated muscle fibre bundles be substantially in parallel alignment with each other. The nature of the meat being complex and the behaviour of muscle fibre bundles during extrusion being not entirely predictable, the aligned fibre bundles are not necessarily precisely parallel with each other, nor are they as might be expected necessarily always aligned parallel to the axis of extrusion: the separated muscle fibre bundles may thus be in substantially parallel alignment with each other but oblique to the axis of extrusion. However, a microscopic examination of cross-sections of samples of extrudate prepared according to the invention has shown that the majority and certainly at least 70 percent of the separated muscle fibre bundles can themselves be in perfect transverse section, thus confirming that they are substantially parallel to each other.

It is desirable that the paste after extrusion be consolidated to facilitate subsequent handling. Consolidation of the extrudate can be brought about by a variety of means. In one method, the extrudate is frozen by subjecting it to a temperature of less than <2°C. This method is suitable for making products, such as steaks for frying, intended for sale in the raw state from a refrigerated cabinet. Such steaks can if necessary be given a searing treatment, as by quick grilling, to convert their surfaces to a set condition which will enable the products to be handled more easily at thaw point (<2°C) or above. This method is also suitable for making shaped fish products intended for sale in the raw frozen state; for convenience a coating of batter or breading can be applied to such products to improve presentation and to facilitate preparation for consumption.

In another method, the extrudate is subjected to a cooking treatment, for example by application of a steam blanch or hot air, preferably until the centre temperature reaches at least 65°C. The initial stages of cooking may require the application of pressure for the desired shape to be retained; this is especially advantageous where a multi-passage-way nozzle has been used.

The extrudate, preferably after consolidation, may be subdivided into blocks, strips, cubes or pieces for use in making pies or for canning, for dehydration or for freezing. When the extrudate is consolidated by heat setting, it is particularly convenient to employ a scrapless cutter in order to subdivide it into pieces of random shape suitable, for example, for canning in sauce as a complete meal or as meat dish ingredient such as goulash. Furthermore, in order to simulate further the shapes of roughly cut or diced whole meat as they may occur in such canned, dried or frozen products, we have found it preferable to cut or otherwise subdivide the heat-coagulated extrudate at a temperature of from 5-15°C; it appears that cutting at a lower temperature can result in too clean a cut so that the individual chunks of meat too nearly resemble defined geometric shapes, whereas cutting at a temperature higher than 15°C can result in excessive heating of the thus over softened extrudate, so resulting in pieces of meat which are too ragged in appearance. Cutting at a temperature of from 5°-15°C thus provides a means whereby the shape of randomly chopped chunks of whole meat is more nearly simulated.

The invention can be applied to the preparation of cured meat products, such as cured pork meat products, by including curing salts in the meaty mixture prior to its moulding and consolidation. Curing is very rapid, presumably because of the intimate contacts that exist between the curing salts and the raw meat. In this way a cooked product resembling ham can be obtained as a large piece, alignment of separated cooked muscle fibre bundles throughout most of the piece being achieved by employment of a multi-pathway nozzle as described earlier. Such a product can be stored as such or sliced for sale in packages of the usual kind. The pork meat product can if desired be formed with a surface layer of tissue fat attached to the underlying meat, to simulate the appearance of ham.

Meat products obtained by the method of the invention can be dehydrated by conventional means. Furthermore, many of the products especially those prepared from beef or chicken, when dehydrated give products which rehydrate relatively rapidly. By drying cooked meat products obtained by the invention to a moisture content of less than 10 percent, basis dried product, one can obtain meat pieces suitable for incorporation in thick gravies and sauces, and in dehydrated meals containing gravy forming ingredients. By contrast, dried cooked natural meat pieces are not generally satisfactory for such use, owing to their relatively slow rate of rehydration in such a medium.

The invention is illustrated by the following Examples.

EXAMPLE 1

This example illustrates the preparation of a dehydrated reformed beef product.

Preparation of cooked texturising component

Frozen Argentinian boneless topside of beef was tempered at −2°C, cut into quarter kilo chunks and cooked at 120°C for 60 minutes. The broth obtained was concentrated and held in chill until required subsequently for addition to the paste before extrusion. The cooked meat pieces were rubbed for 20 seconds in a bowl chopper with a blade set at a gap for 4mm from the bowl wall. The fibrous material obtained was shown on microscopic examination to consist almost entirely of muscle fibre bundles of average length from 1 to 2.5cm and average diameter of about 1mm. The proportion of cooked separated muscle fibre bundles having these dimensions represent about 90 percent by weight expressed on a solids basis, of thaction, the remainder being fragments of fibres, fibre bundles and other meat tissue structures.

Preparation of comminuted raw meat composition and paste

Frozen Argentinian boneless topside of beef was tempered at −2°C, cut in quarter kilo chunks and passed through a mincer plate having 3mm diameter holes. The effect of this was to provide coarsely ground raw meat particles of average size about 3mm surrounded and in intimate admixture with emulsified finely divided raw meat of much smaller particle size. The minced meat emulsion was thoroughly mixed for 15 minutes with salt, monosodium glutamate, polyphosphates and flavouring materials and then mixed for a further 2 minutes after an addition of an appropriate proportion of the separated cooked muscle fibre bundle fraction and finally mixed for 6 minutes after addition of concentrated broth, the final 60 seconds being under vacuum.

The meat paste so obtained had the following composition:

| | % w/w |
|---|---|
| Argentinian boneless beef (5% fat) raw | 48 |
| Argentinian boneless beef cooked | 39 |
| Concentrated beef broth | 9 |
| Salts | 4 |

Extrusion and drying

The paste was extruded at room temperature under a pressure of about 2kg/cm² from a meat stuffer fitted with a rectangular section nozzle 12 × 3cm at the imput end tapering to 12 × 0.6cm at the output end over a length of 25cm. The extruded slab of reformed meat (the extrudate) was heat coagulated by subjecting it to an air stream having a dry bulb temperature of 110°C and a wet bulb temperature of 85°C for 20 minutes. During this time, a reduction in weight of approximately 10 percent occurred. The coagulated sheets of extrudate were cut to a convenient size with a scrapless cutter and dried to a moisture content of 5 percent by weight on a belt drier for 4 hours at a temperature of 80°C.

The product so obtained was capable of rehydrating rapidly in hot water and was very similar in texture and appearance when cooked, to pieces of whole cooked beef topside of a similar size.

Microscopic examination

Transverse frozen sections of the extrudate after heat coagulation were examined under the microscope for distribution and orientation of muscle fibres and muscle fibre bundles. The following table sets out the mean field counts of muscle fibre bundles which were observed to be in parallel alignment with each other: comparative figures for muscle fibre bundles apparently not in alignment with the majority are also given. It should be noted that parallel alignment was deduced from transverse sections of the extrudate (taken at right angles to the axis of extrusion) by recording the number of muscle fibre bundles which were circular in outline thus indicating that they had been sectioned at right angles to their respective axes. It was further observed that very few individually discernable fibres were visible in these sections.

TABLE

A Comparison of Aligned and Non-Aligned Muscle Fibre Bundles as Observed by Transverse Microscopic Section of Heat Coagulated Beef Extrudate

| Sample No. | Aligned Fibre Bundles (%) | Non-Aligned Fibre Bundles (%) |
|---|---|---|
| 334 | 97 | 3 |
| 335 | 89 | 11 |
| 337 | 97 | 3 |
| 339 | 97 | 3 |
| 340 | 89 | 11 |
| 360 | 97 | 3 |
| 361 | 87 | 13 |
| 363 | 86 | 14 |
| 365 | 86 | 14 |
| 367 | 95 | 5 |

It will be noted from the above results that from 86 to 97 percent of muscle fibre bundles were in parallel alignment with each other and with the axis of extrusion: the average value was 92 percent.

EXAMPLE II

This Example illustrates the preparation of a dehydrated reformed chicken product.

Preparation of cooked texturising component

Whole fresh chickens were cooked at a temperature 120°C for 60 minutes and the broth obtained was concentrated and held in chill until required subsequently for addition to the paste for extrusion. The cooked chickens were then deboned and the cooked chicken meat was rubbed for 20 seconds in a bowl chopper with the blades set at a gap of 4mm from the bowl wall. The fibrous material obtained showed on microscopic examination to consist of muscle fibre bundles of average length 0.2 to 0.5cm and about 1mm in diameter and representing about 55 percent by weight expressed on a solids basis of this cooked chicken fraction; the fibrous material also contained other particles of a fibrous nature.

Preparation of comminuted raw meat composition and paste

Fresh raw chicken was passed through a mincer plate having 3mm diameter holes, and the minced meat was thoroughly mixed with finely comminuted raw chicken skin, chicken broth, salt and monosodium glutamate. A proportion of the cooked muscle fibre bundle fraction was finally added and mixing completed under vacuum.

The chicken meat paste so obtained had the following composition:

| | % w/w |
|---|---|
| Cooked chicken | 40 |
| Raw chicken including skin (10% fat) | 51 |
| Chicken broth | 4 |
| Salts and flavourings | 5 |

Extrusion and drying

The chicken meat paste was extruded, coagulated and dried as described in Example I, and was shown to have an aligned fibrous structure similar to that observed in the corresponding beef product.

EXAMPLE III

This Example illustrates the preparation of a canned reformed beef product.

Preparation of cooked texturising component

The cooked beef fibre bundle fraction was prepared in the manner described for Example I.

Preparation of comminuted raw meat composition

Quarter kilo chunks of raw frozen Argentinian beef were bowl chopped at a blade setting of 1mm together with added ice for 40 seconds (40 revolutions of the bowl) and then flavouring materials, salt and polyphosphate were added and chopping continued for a further 60 seconds (60 revolutions). Fat was added and bowl chopping continued for 100 seconds (100 revolutions). The temperature of the mix had by then risen to about 10°C. The average particle size of the raw meat ingredient was less than 2mm.

Mixing to form a paste

The chopped raw meat ingredient and the rubbed cooked fibrous ingredient were intimately mixed for 6 minutes in a Z-arm mixer, a vacuum being applied for the final 60 seconds to de-aerate the paste so formed.

This meat paste had the following composition:

| | % w/w |
|---|---|
| cooked beef | 30 |
| raw beef (including 5% fat) | 33 |
| fat | 20 |
| broth | 15 |
| salts | 2 |

Extrusion and canning

The meat paste was extruded under the conditions described in Example I and was found to have a similar structure with respect to the parallel axial arrangement of separated cooked muscle fibre bundles.

The extrudate was heat coagulated by exposure to live steam for 5 minutes. The coagulated sheets of extrudate were cut to convenient sizes with a scrapless cutter and subsequently canned in a meat sauce with vegetables. Each of the meat pieces were shown on microscopic examination to contain individual muscle fibre bundles, about 90 percent of which were substantially parallel to each other.

EXAMPLE IV

This Example illustrates the preparation of a canned reformed pork product.

The cooked texturising component and the comminuted raw meat composition were prepared from pork in the manner described in Example III. Ingredients were mixed in a Z-arm mixer and the pork meat paste so obtained had the following composition:

|  | % w/w |
|---|---|
| Raw pork (22% fat) | 57 |
| Cooked pork | 30 |
| Water (ice) | 10 |
| Salts | 3 |

The paste was extruded, heat coagulated, diced and canned in the manner described under Example III. The product on microscopic examination was shown to contain separated muscle fibre bundles between 0.2 and 0.5cm long, most of which were in substantial parallel alignment with each other.

EXAMPLE V

This Example illustrates the preparation of a canned reformed chicken product.

The procedure described in Example III was repeated using chicken meat instead of beef and the chicken meat paste obtained after mixing cooked and raw ingredients had the following composition:

|  | % w/w |
|---|---|
| Raw chicken including skin (10% fat) | 58 |
| Cooked chicken | 30 |
| Water, ice broth | 10 |
| Salts | 2 |

The chicken meat paste was extruded, heat coagulated, diced and canned as described in Example III and was shown to have a fibre bundle alignment structure similar to that observed in the corresponding beef product.

EXAMPLE VI

This Example illustrates the preparation of a frozen reformed fish product.

Preparation of raw texturising component and comminuted raw meat composition

Pieces of filleted cod were passed through a perforated plate having 1.5mm diameter holes. The finely divided fish so obtained was found on microscopic examination to consist largely of separated muscle fibre bundles intermixed with other fibrous debris of a dimension smaller than 2mm and a colloidal emulsion of very finely divided particles of fish muscle.

Preparation of fish meat paste

The finely divided fish containing separated muscle fibre bundles in a raw state was mixed with polyphosphate and water in a Z-arm mixer to obtain a paste which, after de-aeration, was extruded through a nozzle 2cm × 1cm in rectangular cross-section and 10cm in length.

The extruded fish on microscopic examination was shown to have an aligned structure in which about 90 percent of the individual separated muscle fibre bundles were in alignment with each other and with the axis of extrusion.

The strip of extruded fish was cut into pieces 6 cm long and was frozen, enrobed with a breading mix as used in fish finger manufacture, lightly fried and then stored in deep freeze until required for consumption. On frying for three minutes in shallow oil, the reformed fish fingers when consumed were shown to have a texture and appearance which resembled that of fish fingers prepared from whole fillets of fish.

EXAMPLE VII

This Example illustrates the preparation of reformed beef suitable for canning or for meat pie manufacture.

1. Preparation of texturising component consisting essentially of separated cooked muscle fibre bundles a. Frozen shoulder clods and chucks were cut into cubes of about 10 cm and then thawed at 4°C for 18 – 20 hours.

b. The thawed cubes were then cooked in a pressure cooker at about 7 kg super-pressure and 116°C for 40 minutes. The cooked meat was allowed to cool at room temperature (18°C) and was then stored at 4°C until required for use.

c. The cooked meat cubes were shredded to fibres using a Meissner bowl chopper — Model RZN 33/106 — at a bowl speed of 10 rpm. To ensure minimum cutting of the meat, the blade clearance from the bowl wall was raised to 2 mm instead of using the standard setting of 1 mm. The separated muscle fibre bundles so produced were from 12–25 mm in length and 0.5–1 mm in diameter. Chunks and gristles were removed by hand from the texturising component before subsequent mixing to form the paste.

2. Preparation of comminuted raw meat composition a. Frozen boneless cow meat and beef plates, were cut into cubes of about 5cm, thawed and then stored at 4°C prior to comminution.

b. The cubes were bowl chopped again using the Meissner bowl chopper, this time with a blade to bowl wall setting of 1 mm. Salts and ice were added at this stage and the mixtured was chopped for 5 minutes (50 revolutions) to form an emulsion with the fat finely dispersed, care being taken to ensure that the meat temperature did not exceed 10°C.

3. Preparation of Paste 3.2 kg of the comminuted raw meat composition was mixed with 1.4 kg of the texturising component for 3 minutes in a Hobart mixer (Model A-200-T) with the aid of a dough hook.

The paste had the following composition

|  | % w/w |
|---|---|
| texturising component (cooked meat fibre bundles) | 30.0 |
| comminuted raw meat composition: |  |
| boneless cow | 41.2 |
| beef plates | 21.9 |
| salt | 1.2 |
| water (as ice) | 5.7 |

The total solids of the paste so formed was 39.96 percent, of which 18.73 percent was fat, 18.73 percent was protein and 2.5 percent was returned as ash.

4. Paste extrusion

The paste was extruded using a Matador sausage filler fitted with a rectangular section tapered-pathway nozzle, having an inlet end dimension of 6.3 cm × 15 cm, an outlet end dimension of 1.27 cm × 15 cm and a length of 33 cm. The extrudate was received onto trays as a slab and then cooked by steaming for 6 minutes at 100°C in an open steam cooker.

Some of the cooked meat was finally ground by passing the heat set slabs through a 3.2 mm plate, whilst the remainder was cut into cubes of approximately 2.5 cm size.

EXAMPLE VIII

This Example illustrates the preparation of reformed beef suitable for canning or for meat pie manufacture.

The procedure of Example VII was repeated using different proportions of the same ingredients, the paste having the following composition:

|  |  | % w/w |
|---|---|---|
| texturising component (cooked meat fibre bundles) | | 30.0 |
| comminuted raw meat composition | | |
|   boneless cow | | 25.5 |
|   beef plates | | 30.5 |
|   salt | | 1.3 |
|   water (as ice) | | 12.7 |
| Analysis | | |
|   fat | 20.90% | |
|   protein | 16.65% | |
|   ash | 2.50% | |
|   total solids | 40.05% | |

EXAMPLE IX

This Example illustrates the preparation of reformed beef suitable for canning or for meat pie manufacture.

The procedure of Example VII was repeated using different proportions of the same ingredients, heart meat being used in place of beef plates and with the additional use of suet. The paste had the following composition:

|  |  | % w/w |
|---|---|---|
| texturising component (cooked meat fibre bundles) | | 30.0 |
| comminuted raw meat composition | | |
|   boneless cow | | 24.8 |
|   heart meat | | 30.0 |
|   suet | | 13.8 |
|   salt | | 1.1 |
|   water (as ice) | | 0.3 |
| Analysis | | |
|   fat | 18.73% | |
|   protein | 18.73% | |
|   ash | 2.50% | |
|   total solids | 39.96% | |

EXAMPLE X

This Example illustrates the preparation of reformed beef suitable for canning or for meat pie manufacture.

The procedure of Example IX was repeated using different proportions of the same ingredients, the paste having the following composition:

|  |  | % w/w |
|---|---|---|
| texturising component (cooked meat fibre bundles) | | 30.0 |
| comminuted raw meat composition | | |
|   boneless cow | | 32.5 |
|   heart meat | | 15.0 |
|   suet | | 13.4 |

-Continued

|  |  | % w/w |
|---|---|---|
| salt | | 1.2 |
| water (as ice) | | 7.9 |
| Analysis | | |
|   fat | 18.73% | |
|   protein | 18.73% | |
|   ash | 2.50% | |
|   total solids | 39.96% | |

EXAMPLE XI

This Example illustrates the preparation of reformed beef suitable for canning or for meat pie manufacture.

The procedure of Example IX was repeated using different proportions of the same ingredients, the paste having the following composition:

|  |  | % w/w |
|---|---|---|
| texturising component (cooked meat fibre bundles) | | 30.0 |
| comminuted raw meat composition | | |
|   boneless cow | | 13.6 |
|   heart meat | | 30.0 |
|   suet | | 18.0 |
|   salt | | 1.2 |
|   water (as ice) | | 7.2 |
| Analysis | | |
|   fat | 20.90% | |
|   protein | 16.65% | |
|   ash | 2.50% | |
|   total solids | 40.05% | |

EXAMPLE XII

This Example illustrates the preparation of reformed beef suitable for canning or for meat pie manufacture.

The procedure of Example IX was repeated using different proportions of the same ingredients, the paste having the following composition:

|  |  | % w/w |
|---|---|---|
| texturising component (cooked meat fibre bundles) | | 30.0 |
| comminuted raw meat composition | | |
|   boneless cow | | 26.4 |
|   heart meat | | 15.0 |
|   suet | | 16.9 |
|   salt | | 1.2 |
|   water (as ice) | | 10.5 |
| Analysis | | |
|   fat | 20.90% | |
|   protein | 16.65% | |
|   ash | 2.50% | |
|   total solids | 40.05% | |

EXAMPLE XIII

This Example illustrates the preparation of reformed beef suitable for canning or for meat pie manufacture.

The procedure of Example VII was repeated using the same ingredients in the same proportions but with the additional process step of deaerating the paste during the final minute of mixing by application of a vacuum.

The product finally obtained had a more compact constitution and the fibre bundle alignment was more discernable by virtue of the improved chewing texture of the product when consumed.

EXAMPLE XIV

This Example illustrates the preparation of reformed beef steaks.

A meat paste was prepared as described for Example IX, the paste also containing a proportion of chopped vegetables and meal then being extruded through a cylindrical nozzle 25 cm in length and 3 cm in diameter into a cellulose casing.

The paste had the following composition:

| | % w/w |
|---|---|
| texturising component (cooked meat fibre bundles) | 20.5 |
| comminuted raw meat composition | |
| boneless cow | 18.0 |
| heart meat | 10.5 |
| suet | 11.5 |
| salt | 1.6 |
| water (as ice) | 7.0 |
| meal (binder) | 11.5 |
| chopped vegetables | 19.4 |

The stuffed casings were then heated to an internal temperature of 70°C in a Proctor and Schwartz drier. The heat set meat, when cool, was sliced into steaklets.

EXAMPLE XV

This Example illustrates the preparation of reformed beef steaks.

The procedure of Example XIV was repeated using different proportions of the same ingredients.

The paste had the following composition:

| | % w/w |
|---|---|
| texturising component (cooked meat fibre bundles) | 15.0 |
| co2composition | |
| boneless cow | 11.5 |
| heart meat | 8.0 |
| suet | 26.0 |
| salt | 1.4 |
| water (as ice) | 5.5 |
| meal (binder) | 11.5 |
| chopped vegetables | 21.1 |

EXAMPLE XVI

This Example illustrates the preparation of reformed beef steaks.

The procedure of Example XV was repeated using the same proportions of the same ingredients but with the additional process step of deaerating the paste during the final minute of mixing by application of a vacuum.

The product finally obtained had a more compact constitution and the fibre bundle alignment was more discernable by virtue of the improved chewing texture of the product when consumed.

What is claimed is:

1. A process for preparing a shaped, consolidated meat product from a meat paste having a moisture content of from about 50 percent to about 80 percent and a fat content of from about 1 percent to about 40 percent, which process comprises the steps of:
   i. subdividing raw meat to a finely divided state in the form of an emulsion of fat and water stabilized at least partly by raw meat protein, the raw meat having an average particle size of less than 2 mm;
   ii. subdividing cooked meat to provide separated muscle fibre bundles, each fibre bundle being from 2 to 50 mm in length and from 0.5 to 2 mm in diameter;
   iii. blending from 30 to 97.5 parts by weight of the finely divided raw meat emulsion and from 2.5 to 70 parts by weight of the separated muscle fibre bundles of cooked meat to provide a meat paste;
   iv. extruding said meat paste to form a product wherein the proportion of muscle fibre bundles which are in substantial parallel alignment with each other is from 70 to 100 percent; and
   v. consolidating said product by freezing or by heat.

2. A process in accordance with claim 1, wherein said paste before extrusion is degassed by mixing said paste at subatmospheric pressure to remove entrapped air or other gas.

3. A process in accordance with claim 1, further comprising the step of drying the product to a moisture content of less than 10 percent by weight, basis dried product.

4. A process in accordance with claim 1 which comprises subdividing cooked meat in a bowl chopper having a gap setting between knife and bowl of 2 to 4 mm, thereby to provide the separated meat fibre bundles.

5. A process for preparing a shaped, consolidated fish product from a paste having a moisture content of from about 50 percent to about 80 percent and a fat content of from about 1 percent to about 40 percent, which comprises the steps of:
   i. subdividing raw fish so as to provide a finely divided raw fraction in the form of an emulsion of fat and water stabilized at least partly by raw fish protein, the raw fish having an average particle size of less than 2 mm, and a fibre bundle fraction comprising separated muscle fibre bundles, each fibre bundle being from about 2 to about 50 mm in length and from about 0.5 to about 2 mm in diameter;
   ii. blending the finely divided fraction and the separated muscle fibre bundle fraction to provide a paste comprising from 30 to 97.5 percent by weight of the finely divided fraction and from 2.5 to 70 percent by weight of the separated muscle fibre bundle fraction;
   iii. extruding said paste to form a shaped product wherein the proportion of muscle fibre bundles which are in substantial parallel alignment with each other is from 70 to 100 percent; and
   iv. consolidating said product by freezing or by heat.

6. A process in accordance with claim 5 wherein said paste before extrusion is degassed by mixing said paste at sub-atmospheric pressure to remove entrapped air or other gas.

7. A process in accordance with claim 5, further comprising the step of drying the product to a moisture content of less than 10 percent by weight, basis dried product.

8. A process in accordance with claim 5 which comprises subdividing raw fish in a bowl chopper having a gap setting between knife and bowl of 2 to 4 mm, thereby to provide the separated fish fibre bundles.

9. A shaped consolidated meat product prepared by the process of claim 1.

10. A shaped consolidated fish product prepared by the process of claim 5.

* * * * *